(12) United States Patent
Stepp et al.

(10) Patent No.: US 11,203,669 B2
(45) Date of Patent: Dec. 21, 2021

(54) METHOD FOR PREPARING UREA-FUNCTIONAL SILOXANES

(71) Applicant: WACKER CHEMIE AG, Munich (DE)

(72) Inventors: Michael Stepp, Ueberackern (AT); Birgit Peschanel, Burghausen (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/609,547

(22) PCT Filed: Jan. 31, 2018

(86) PCT No.: PCT/EP2018/052431
§ 371 (c)(1),
(2) Date: Oct. 30, 2019

(87) PCT Pub. No.: WO2019/149355
PCT Pub. Date: Aug. 8, 2019

(65) Prior Publication Data
US 2020/0369835 A1    Nov. 26, 2020

(51) Int. Cl.
*C08G 77/388* (2006.01)

(52) U.S. Cl.
CPC .................. *C08G 77/388* (2013.01)

(58) Field of Classification Search
CPC .............................. C08G 77/26; C08G 77/388
See application file for complete search history.

(56) References Cited

U.S. PATENT DOCUMENTS

| | | | | |
|---|---|---|---|---|
| 2,942,019 A * | 6/1960 | Pike | ...................... | C07F 7/0889 556/413 |
| 3,754,971 A * | 8/1973 | Pepe | ...................... | C08G 77/26 523/217 |
| 3,772,351 A | 11/1973 | Krahuke | | |
| 4,046,794 A | 9/1977 | Pepe et al. | | |
| 2016/0200875 A1 | 7/2016 | Patel et al. | | |

FOREIGN PATENT DOCUMENTS

| | | |
|---|---|---|
| CN | 105658695 A | 6/2016 |
| CN | 107298930 A | 10/2017 |

OTHER PUBLICATIONS

Ritesh Singh et al., Rhodium (II)-Catalyzed Undirected and Selective C(sp2)-H Amination en Route to Benzoxazolones, ACS Catalysis, Aug. 29, 2016, pp. 6520-6524, vol. 6, American Chemical Society, Washington, DC.
Jong-Uk Kim et al., Simple chiral urea gelators, (R)- and (S)-2-heptylura: Their gelling ability enhanced by chirality, Journal of Colloid and Interface Science, May 15, 2011, pp. 428-433, vol. 357, Issue 2, Elsevier Inc., Amsterdam, Netherlands.

* cited by examiner

*Primary Examiner* — Kuo Liang Peng
(74) *Attorney, Agent, or Firm* — Brooks Kushman P.C.

(57) ABSTRACT

Urea-functional organopolysiloxanes containing units of the formula $$R_n SiO_{(4-n)/2} \quad (I),$$

where R is a radical $R^1$ or a radical $—OR^2$ or a radical Q, Q is a urea-functional radical of the formula $$—R^5—[NR^4—R^6—]_x NR^4 R^3 \quad (II),$$

where the radicals $R^4$ are identical or different and are each a radical $R^{4'}$ or a radical $R^u$, where $R^{4'}$ is hydrogen or a monovalent $C_1$-$C_6$-hydrocarbon radical where $R^u$ is radical of the formula $—C(=O)—NH_2$, and where at least one urea-functional radical Q having a radical $R^u$ is present per molecule are prepared by reacting amino-functional organopolysiloxanes comprising units of the formula $$R'_n SiO_{(4-n)/2} \quad (IV),$$

where A is an amino-functional radical of the formula $$—R^5—[NR^{4'}—R^6—]_x NR^{4'} R^3 \quad (V),$$

with the proviso that at least one amino-functional radical A is present per molecule in the organopolysiloxanes made up of units of the formula (III),
with ortho-substituted aryl carbamates of the formula $$R^7—Ar—O—C(=O)—NH_2 \quad (VI),$$

where Ar is an ortho-substituted aryl radical.

10 Claims, 1 Drawing Sheet

METHOD FOR PREPARING UREA-FUNCTIONAL SILOXANES

CROSS REFERENCE TO RELATED APPLICATIONS

This application is the U.S. National Phase of PCT Appln. No. PCT/EP2018/052431 filed Jan. 31, 2018, the disclosure of which is incorporated in its entirety by reference herein.

BACKGROUND OF THE INVENTION

1. Field of the Invention

The invention relates to a process for preparing urea-functional organopolysiloxanes having $NH_2$—$C(O)$—$N$— radicals.

2. Description of the Related Art

Siloxanes having polar urea functions have, in contrast to amino-functional siloxanes, a neutral reaction in an aqueous environment and are therefore of interest as surface-active or hydrophilicizing substances in a physiological environment, e.g. as a constituent of cosmetics. The extremely polar urea group is able to form strong hydrogen bonds, for which reason correspondingly functionalized (poly)siloxanes make, in contrast to the analogous amino-functional representatives, a stronger interaction with surfaces and thus possibly a greater permanence as additives.

Owing to the high polarity of the urea function, the introduction of this function into the siloxane framework, which has a low polarity, from polar precursors such as urea as described in U.S. Pat. No. 3,772,351, is difficult to impossible. Even a circuitous route via the base-catalyzed equilibration of a urea-functional alkoxysilane with siloxanes is not a feasible route because of the instability of the urea function in the presence of bases.

The reaction of primary amines with phenyl carbamate in the presence of triethylamine has been described by Kim, J.-U. et al., Journal of Colloid and Interface Sci. 357, 428-433 (2010). Here, the —(C═O)—$NH_2$ group is transferred to the primary or secondary amine function with elimination of phenol. The analogous reaction (without use of amines as auxiliaries) has been described in principle for polysiloxanes and silanes in U.S. Pat. No. 4,046,794 A of Union Carbide Co. from the late 1960s, as has the use of the polymers as bonding agents between organic and inorganic substrates, in particular for glass fiber/polymer composites. However, the examples reported are based exclusively on reactions of aminoalkylsilanes with alkyl carbamates (e.g. the toxic O-ethyl carbamate), which are substantially less reactive and require tin-containing catalysts for an acceptable reaction rate.

Although the direct reaction of amino-functional polysiloxanes with phenyl carbamate gives the desired urea-functional polysiloxanes, it has the disadvantage that significant proportions of phenoxy-Si radicals arise and in later use can liberate toxic phenol (CMR2 substance (CMR=carcinogenic, mutagenic and toxic reproduction), H341 "suspected of causing genetic defects") as a result of hydrolysis.

It was therefore an object of the invention to provide a process for preparing urea-functional organopolysiloxanes which is simple to carry out, in which the abovementioned disadvantages are avoided and in which no toxic by-products are formed.

SUMMARY OF THE INVENTION

The invention provides a process for preparing urea-functional organopolysiloxanes containing units of the formula (I)

$$R_nSiO_{(4-n)/2} \quad (I)$$

where
R is a radical $R^1$ or a radical —$OR^2$ or a radical Q, where
$R^1$ is a monovalent optionally halogenated hydrocarbon radical having from 1 to 18 carbon atoms,
$R^2$ is a hydrogen atom or a monovalent $C_1$-$C_6$-hydrocarbon radical,
Q is a urea-functional radical of the formula (II)

$$—R^5—[NR^4—R^6—]_xNR^4R^3 \quad (II),$$

where
$R^3$ is a hydrogen atom or a monovalent $C_1$-$C_6$-hydrocarbon radical, preferably a hydrogen atom,
the radicals $R^4$ are identical or different and are each a radical $R^{4'}$ or a radical $R''$, where
$R^{4'}$ is a hydrogen atom or a monovalent $C_1$-$C_6$-hydrocarbon radical,
$R''$ is a radical of the formula (III)

$$—C(═O)—NH_2 \quad (III)$$

$R^5$ is a divalent $C_1$-$C_{18}$-hydrocarbon radical, preferably a divalent $C_2$-$C_4$-hydrocarbon radical,
$R^6$ is a divalent $C_1$-$C_{18}$-hydrocarbon radical, preferably a divalent $C_2$-$C_4$-hydrocarbon radical,
x is 0, 1 or 2 and
n is 0, 1, 2 or 3 and preferably on average from 2.00 to 2.66,
with the proviso that at least one urea-functional radical Q, which has a radical $R''$ is present per molecule in the organopolysiloxanes containing units of the formula (I), by reacting amino-functional organopolysiloxanes containing units of formula (IV)

$$R'_nSiO_{(4-n)/2} \quad (IV),$$

where
$R'$ is a radical $R^1$ or a radical —$OR^2$ or a radical A, where
$R^1$, $R^2$ and n are as defined above and
A is an amino-functional radical of the formula (V)

$$—R^5—[NR^{4'}R^6—]_xNR^{4'}R^3 \quad (V),$$

where
$R^3$, $R^4$, $R^5$, $R^6$ and x are as defined above,
with the proviso that at least one amino-functional radical A is present per molecule in the organopolysiloxanes made up of units of formula (IV),
with ortho-substituted aryl carbamates of the formula (VI)

$$R^7—Ar—O—C(═O)—NH_2 \quad (VI),$$

where
Ar is an ortho-substituted aryl radical, preferably an ortho-substituted phenyl radical, where Ar can contain further substituents in the ortho', meta or para position in addition to the ortho substituent $R^7$, and
$R^7$ is the ortho substituent bound to Ar, where $R^7$ is a $C_1$-$C_6$-alkyl radical, a $C_1$-$C_6$-carboxalkyl radical, a $C_1$-$C_6$-alkoxy radical or a halogen radical.

DETAILED DESCRIPTION OF THE PREFERRED EMBODIMENTS

Figure 1:
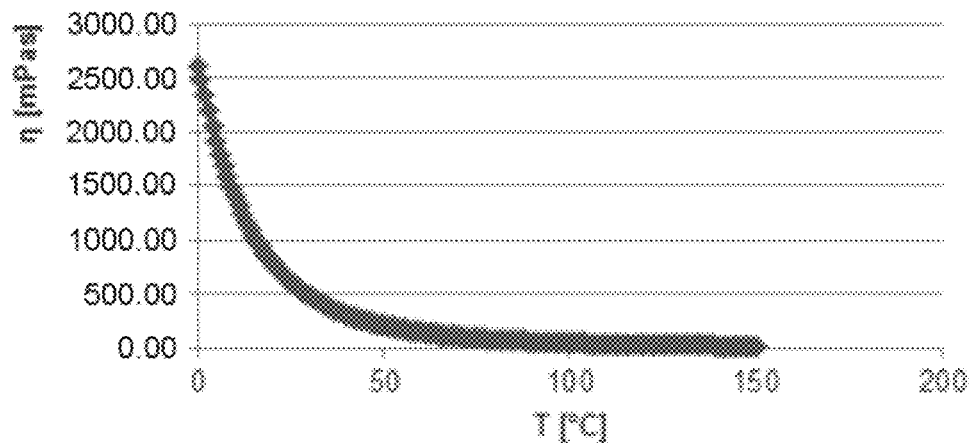
FIG. 1 illustrates the relationship between temperature and viscosity for the urea-functional organopolysiloxane of Example 4a).

In the process of the invention, $R^7$—Ar—OH, where Ar and $R^7$ are as defined above, an ortho-substituted phenol, is preferably eliminated when using an ortho-substituted phenol carbamate.

It has surprisingly been found that replacement of the phenyl radical in phenyl carbamate by ortho-substituted phenyl radicals makes it possible to prevent the formation of undesirable Si—O-bonded phenyl radicals in the urea-functional organopolysiloxane. A further advantage of the process of the invention is the generally lower melting point of the ortho-substituted phenols liberated. Since they are usually liquid at room temperature, they can be more easily condensed from the vapor and recovered for recycling. In addition, many of these compounds are classified as less hazardous to health than phenol, which makes handling of them easier in a production environment. Traces of these phenols remaining in the end product is therefore also less critical.

In the organopolysiloxanes of the invention containing units of the formula (I), preference is given to
- at least 50% of all radicals R being a $C_1$-$C_6$-alkyl radical $R^1$,
- at least 0.1% of all radicals R being a radical Q of the formula (II),
- where at least one radical $R^4$ in at least one radical Q is $R^u$, and
- not more than 3% of all radicals R being a radical —$OR^2$, where Q, R, $R^1$, $R^2$, $R^4$ and $R^u$ are as defined above.

The organopolysiloxanes made up of units of the formula (I) can be linear, cyclic or branched and can be oligomeric or polymeric. They preferably contain at least 3 Si atoms and not more than 2000 Si atoms, preferably not more than 600 Si atoms.

The reaction of the aryl carbamate with the amino functions in the organopolysiloxanes containing units of the formula (IV) preferably does not result in any significant change in the siloxane framework.

In the amino-functional organopolysiloxanes containing units of the formula (IV) used in the process of the invention, preference is given to
- at least 50% of all radicals R being a $C_1$-$C_6$-alkyl radical $R^1$,
- at least 0.1% of all radicals R being a radical A of the formula (V) and
- not more than 3% of all radicals R being a radical —$OR^2$, where A, R, $R^1$ and $R^2$ are as defined above.

The organopolysiloxanes containing units of the formula (IV) can be linear, cyclic or branched and can be oligomeric or polymeric. They preferably contain at least 3 Si atoms and not more than 2000 Si atoms, more preferably not more than 600 Si atoms.

Examples of hydrocarbon radicals $R^1$ are alkyl radicals such as the methyl, ethyl, n-propyl, isopropyl, n-butyl, 2-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical and decyl radicals such as the n-decyl radical; cycloalkyl radicals such as the cyclopentyl, cyclohexyl, 4-ethylcyclohexyl and cycloheptyl radicals, norbornyl radicals and methylcyclohexyl radicals; alkenyl radicals such as the vinyl, 2-propen-2-yl, allyl, 3-buten-1-yl, 5-hexen-1-yl and 10-undecen-1-yl radical; cycloalkenyl radicals such as the 2-cyclohexenyl, 3-cyclohexenyl, cyclopentadienyl and 2-(cyclohex-3-en-1-yl)ethyl radical, aryl radicals such as the phenyl, biphenylyl, naphthyl radical; alkaryl radicals such as the o-, m-, and p-tolyl radicals and phenylethyl radicals such as the 2-phenylethyl and 1-phenylethyl radical, and aralkyl radicals such as the benzyl radical.

When $R^1$ is a halogenated hydrocarbon radical, the halogen radicals on $R^1$ are preferably fluorine radicals.

Examples of halogenated hydrocarbon radicals $R^1$ are the 3,3,3-trifluoropropyl and 5,5,5,4,4,3,3-heptafluoropentyl radicals.

The radicals $R^1$ preferably have from 1 to 6 carbon atoms, more preferably from 1 to 4 carbon atoms. $R^1$ is more preferably a methyl radical. If $R^1$ is an unsaturated radical, preference is given to the vinyl radical.

Examples of the hydrocarbon radicals $R^2$, $R^3$ or $R^{4'}$ having from 1 to 6 carbon atoms are given in the examples for $R^1$. Preferred hydrocarbon radicals are in each case ethyl and methyl radicals.

$R^3$ is preferably a hydrogen atom.

Examples of radicals $R^5$ are radicals of the formula —$CH_2$—, —$CH_2$—$CH_2$—, —$CH_2$—$CH_2$—$CH_2$— and —$CH_2$—$CH(CH_3)$—$CH_2$—. Examples of radicals $R^6$ are radicals of the formula —$CH_2$—$CH_2$— and —$CH_2$—$CH_2$—$CH_2$—.

Examples of radicals $R^7$ are the methyl, ethyl, propyl, isopropyl, methoxy, ethoxy, carboxyethyl, carboxymethyl, fluorine, chlorine and bromine radicals.

Preferred amino-functional radicals A of the formula (V) are radicals of the formula

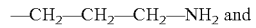

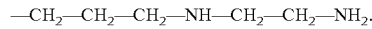

Preferred urea-functional radicals Q of the formula (II) are radicals of the formula

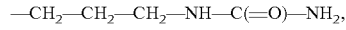

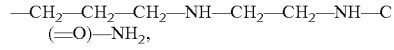

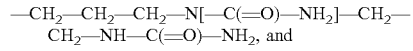

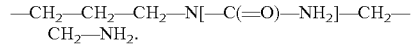

The organopolysiloxanes containing units of the formula (I) are preferably organopolysiloxanes of the formula (VII)

$$Q_k R^*_{3-k}SiO(R^1_2SiO)_m(QR^*SiO)_p SiR^*_{3-k}Q_k \quad (VII)$$

where
- $R^*$ is a radical $R^1$ or a radical —$OR^2$,
- $R^1$ and $R^2$ are as defined above,
- Q is a urea-functional radical of the formula (II)

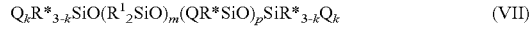

where
- $R^3$ is a hydrogen atom or a monovalent $C_1$-$C_6$-hydrocarbon radical, preferably a hydrogen atom,
- the radicals $R^4$ are identical or different and are each a radical $R^{4'}$ or a radical $R^u$, where
- $R^{4'}$ is a hydrogen atom or a monovalent $C_1$-$C_6$-hydrocarbon radical and R" is a radical of the formula (III)

$$-C(=O)-NH_2 \qquad (III),$$

R⁵ is a divalent $C_1$-$C_{18}$-hydrocarbon radical, preferably a divalent $C_2$-$C_4$-hydrocarbon radical,
R⁶ is a divalent $C_1$-$C_{18}$-hydrocarbon radical, preferably a divalent $C_2$-$C_4$-hydrocarbon radical,
k is 0 or 1,
m is 0 or an integer from 1 to 1000,
p is 0 or an integer from 1 to 50 and
x is 0, 1 or 2,
with the proviso that at least one urea-functional radical Q, which has a radical R" is present per molecule in the organopolysiloxanes of the formula (VII).
Organopolysiloxanes of the formula (VIII)

$$A_lR^*_{3-l}SiO(R^1_2SiO)_o(AR^*SiO)_qSiR^*_{3-l}A_l \qquad (VIII),$$

where
R* and R¹ are as defined above,
A is an amino-functional radical of the formula (V)

$$-R^5-[NR^{4'}-R^6-]_xNR^{4'}R^3 \qquad (V),$$

where
R³, R⁴', R⁵, R⁶ and x are as defined above,
l is 0 or 1,
o is 0 or an integer from 1 to 1000,
q is 0 or an integer from 1 to 50,
are preferably used in the process according to the invention as amino-functional organopolysiloxanes containing units of the formula (IV),
with the proviso that at least one amino-functional radical A is present per molecule in the organopolysiloxanes of the formula (VIII).

The amino-functional organopolysiloxanes made up of units of the formula (IV) and the amino-functional organopolysiloxanes of the formula (VIII) can be prepared by methods known from the literature and some are commercially available.

The ortho-substituted aryl carbamates of the formula (VI) used in the process of the invention can be prepared by methods known from the literature. They are preferably prepared by reaction of the respective ortho-substituted phenol with chlorosulfonyl isocyanate and subsequent hydrolysis as described by Singh, R. et al., ACS Catalysis 6(10), 6520-6524 (2016). The ortho-substituted phenols recovered from the process of the invention can thus be converted by this process back into the corresponding carbamate and thus be recycled, which represents a further advantage of the process of the invention.

As ortho-substituted phenols which are preferred, because they are commercially available, the following are possible as raw materials (and at the same time dissociation products) in the process of the invention:
2-methylphenol (o-cresol),
2-(1-methylethyl)-5-methylphenol (thymol),
2-methyl-5-(1-methylethyl)phenol (carvacrol),
2-ethylphenol,
2-methoxyphenol (guaiacol),
2-chlorophenol,
methyl 2-hydroxybenzoate (methyl salicylate) and
ethyl 2-hydroxybenzoate (ethyl salicylate).

Particular preference is given to 2-methoxyphenol (guaiacol) and
2-methyl-5-(1-methylethyl)phenol (carvacrol).

In the process of the invention, the two reactants, amino-functional organopolysiloxane and aryl carbamate, are brought to react by mixing, e.g. in a stirred vessel, a kneader or a tube reactor. Good mixing is advantageous because the aryl carbamates are preferably present as solid under the reaction conditions, while the amino-functional organopolysiloxanes are liquid. The dissociation product (=ortho-substituted phenol) is preferably removed during the reaction in order to shift the reaction equilibrium in the direction of the target product. This is most preferably effected by lowering the pressure. The reaction temperature is selected so that the desired reaction proceeds very quickly but undesirable secondary reactions (e.g. condensation with biuret formation) are largely avoided and the aryl carbamate remains in the reaction mixture.

The process of the invention is therefore preferably carried out at a temperature of not more than 140° C., more preferably not more than 120° C., and in particular not more than 100° C., and preferably at a temperature of at least 60° C., more preferably at least 80° C.

In order to achieve a high space-time yield at a low reaction temperature, the reaction is preferably carried out at very low pressure, preferably at less than or equal to 100 hPa, more preferably less than or equal to 10 hPa.

The removal of the dissociation product from the reaction mixture can be assisted by additionally passing an inert gas such as nitrogen or steam through the mixture.

Since the reaction of the aryl carbamate of the formula (VI) with the amino groups of the organopolysiloxane made up of units of the formula (IV) or of the formula (VIII) proceeds quantitatively, the molar ratio can be matched to the desired degree of conversion of the amino groups. If complete conversion of the primary and/or secondary amino groups A present in the organopolysiloxanes made up of units of the formula (IV) or of the formula (VIII) is to be achieved, the molar ratio of amino group:aryl carbamate is preferably 1:1. To allow for measurement or calculation errors in the determination of the amine content or the determination of the purity of the aryl carbamate, an excess of aryl carbamate of preferably not more than 20%, more preferably not more than 10%, based on the amino groups, is particularly preferred.

However, if only 50%, for example, of the amino groups are to be converted into urea groups, it is sufficient to reduce the molar amounts of the aryl carbamate used to 50%.

In the process of the invention, the amount of aryl carbamate used is therefore preferably at least 0.5 mol, more preferably at least 1 mol, and preferably not more than 1.2 mol, more preferably not more than 1.1 mol, in each case per mole of amino group in the organopolysiloxanes made up of units of the formula (IV) or of the formula (VIII).

An inert solvent can be used to improve the miscibility and thus accelerate the reaction in the process of the invention. Its boiling point is preferably so high that it does not vaporize under the reaction conditions. It is also possible to use solvent mixtures. Examples of suitable solvents are high-boiling ethers such as diphenyl ether and linear or branched saturated paraffins and also aromatic, optionally alkyl-substituted hydrocarbons.

The degree of conversion in the process of the invention can easily be determined by weighing or determination of the volume of the dissociation product separated off (ortho-substituted phenol). However, it is also possible to use spectroscopic methods (in particular IR and ¹H-NMR spectroscopy, optionally in-line). To remove the remaining dissociation product completely, the crude product can be heated at a temperature which is the same as the reaction temperature, preferably at a temperature which is at least 10° C. higher, more preferably at least 20° C. higher, and/or under reduced pressure. This can be carried out in the reaction vessel or preferably, because it provides milder conditions, in a falling film evaporator, a thin film evaporator or a short path distillation, optionally with steam or an inert gas such as nitrogen being additionally passed through. To improve the flowability, it is possible to use an inert solvent which can easily be separated off by distillation. Examples of such solvents are alcohols such as methanol, ethanol, isopropanol and n-butanol, ethers such as tetrahydrofuran, 2-methyl-tetrahydrofuran, methyl tert-butyl ether and dibutyl ether, linear or branched paraffins and aromatic hydrocarbons such as toluene or xylenes.

The urea-functional organopolysiloxanes of the invention have the particular property of their viscosity dropping significantly more strongly with increasing temperature than in the case of the comparable dimethylpolysiloxanes, i.e. the viscosity/temperature coefficient is higher. It increases significantly with increasing urea content.

COMPARATIVE EXAMPLE 1

Not According to the Invention, Analogous to U.S. Pat. No. 3,772,351 A, Example 3

60 g (=0.069 mol of amine) of an aminopropyl-functional polysiloxane of the average formula $ViSiMe_2O_{1/2}:Me_2SiO_{2/2}:MeSi(CH_2CH_2CH_2NH_2)O_{2/2}=2:29.8:3.2$ (Vi=vinyl radical, Me=methyl radical) were placed in a 250 ml 4-neck flask provided with magnetically coupled stirrer, temperature sensor and distillation attachment and 20.7 g (=0.344 mol) of urea (98%, Merck) were added. The suspension was heated to 130° C. with stirring and continual introduction of 5 l/h of nitrogen. A liquid lower phase of molten urea separated off from the siloxane during this. The white emulsion was stirred for 3 hours at 130° C. while introducing nitrogen into it. The heterogeneous mixture wound around the stirrer at the end. A sticky partially crosslinked polymer which could be dissolved neither in toluene, acetone or methanol was obtained.

COMPARATIVE EXAMPLE 2

Not According to the Invention 120 g (=0.035 mol of amine) of an aminopropyl-functional polysiloxane of the average formula $ViSiMe_2O_{2/2}:Me_2SiO_{2/2}:MeSi(CH_2CH_2CH_2-NH_2)O_{2/2}=2:46.1:1.1$ were placed in a 250 ml 4-neck flask provided with magnetically coupled stirrer, temperature sensor and distillation attachment and 4.9 g (=0.035 mol) of phenyl carbamate ($C_6H_5-O-C(=O)-NH_2$, 98%, Aldrich) were added. While stirring, the white suspension was heated quickly to 80° C. while applying an oil pump vacuum of 2 hPa. The solid gradually dissolved and phenol separated out as a white solid on the condenser. After 2 hours at 80° C., the vacuum was broken by means of nitrogen and a sample of the clear, colorless oil was taken. According to the $^1$H-NMR spectrum in $CDCl_3$ (reference signal of the undeuterated part: 7.24 ppm), the conversion of the amino functions was quantitative (comparison of the signals of the corresponding $CH_2-N$ groups: amine: 2.63 ppm, urea: 3.12 ppm). The product was subsequently heated at 2 hPa to 100° C. and devolatilized under these conditions for half an hour. A total of 3.6 g of solid distillate were obtained. The phenol content calculated from the $^1$H-NMR spectrum of the residue ($^1$H-NMR spectrum in D6-acetone: reference signal of the undeuterated part: 2.04 ppm) was 0.3% by weight (signals at 6.8 ppm, 3H). The residue was subsequently heated in an oil-heated laboratory thin film evaporator at 120° C./5 mbar/250 rpm under a stream of nitrogen of 2 l/min and at a feed rate of about 1.5 ml/min. 115 g of a clear colorless oil and 0.7 g of distillate were isolated. The main losses occurred in the transfer operations and as a result of adhesions in the thin film evaporator. The following composition was indicated by the $^1$H-NMR spectrum: $ViSiMe_2O_{1/2}:Me_2SiO_{2/2}:MeSi[(CH_2)_3-NHC(O)-NH_2]O_{2/2}=2:46.8:1.1$. A urea content of 0.291 mmol/g can be calculated therefrom. The phenoxy-Si content calculated from the $^1$H-NMR spectrum of the residue ($^1$H-NMR spectrum in D6-acetone: reference signal of the undeuterated part: 2.04 ppm) was 68 ppm by weight (signal group at 6.92 ppm, 2H).

EXAMPLE 1

In a manner analogous to comparative example 1, 90 g of the aminopolysiloxane (0.026 mol of amine) were reacted with 4.5 g (0.027 mol) of 2-methoxyphenyl carbamate (prepared from guaiacol and chlorosulfonyl isocyanate as described by Singh, R. et al., ACS Catalysis 6(10), 6520-6524 (2016)) for 2 hours at 80° C. and 1 hPa. According to the $^1$H-NMR spectrum in $CDCl_3$ (reference signal of the undeuterated part: 7.24 ppm), the conversion of the amine functions was quantitative (comparison of the signals of the corresponding $CH_2-N$ groups: amine: 2.63 ppm, urea: 3.12 ppm). An oil pump vacuum (4 hPa) was subsequently applied and the residue was heated for 30 minutes at 130° C. while passing a stream of nitrogen (2-5 l/h) through it. 82.7 g of a colorless, clear oil as a residue and 3.8 g of liquid distillate, in the $^1$H-NMR spectrum of which 2-methoxyphenol (guaiacol) was detected as main component (D6-acetone, signal groups at 7.5 ppm, 6.8 ppm, 6.9 ppm), were isolated. The $^1$H-NMR spectrum of the residue indicated the following composition: $ViSiMe_2O_{1/2}:Me_2SiO_{2/2}:MeSi[(CH_2)_3-NHC(O)-NH_2]O_{2/2}=2:47.3:1.1$ (Vi=vinyl radical, Me=methyl radical).

Not a single signal could be discerned above 6.6 ppm (region of the aryl protons).

EXAMPLE 2

In a manner analogous to example 1, 90 g (0.11 mol of amine) of an amino-functional polysiloxane of the average formula $Me_3SiO_{1/2}:Me_2SiO_{2/2}:MeSi(CH_2CH_2CH_2-NH-CH_2CH_2-NH_2)O_{2/2}=2:17.8:1.1$ were reacted with 22.1 g (=0.13 mol) of 2-methoxyphenyl carbamate and heat treated. Complete conversion of the amine functions into the corresponding urea functions could be confirmed by the absence of the signals between 2.5 and 2.9 ppm and the new signals between 3.0 and 3.5 ppm in the $^1$H-NMR spectrum ($CDCl_3$).

EXAMPLE 3

In a manner analogous to example 2, 90 g (0.11 mol of amine) of an amino-functional polysiloxane of the average formula $Me_3SiO_{1/2}:Me_2SiO_{2/2}:MeSi(CH_2CH_2CH_2-NH-CH_2CH_2-NH_2)O_{2/2}=2:17.8:1.1$ were reacted with 11 g (=0.065 mol) of 2-methoxyphenyl carbamate and heat treated. 48% conversion of the amine functions into the corresponding urea functions could be confirmed from the integrated ratio of the signals between 2.5 and 2.9 ppm and the new signals between 3.0 and 3.5 ppm in the $^1$H-NMR spectrum ($CDCl_3$).

EXAMPLE 4 a) The procedure of example 1 was repeated with the change that 146.9 g (=0.176 mol of amine) of the aminopropyl-functional polysiloxane of the average formula ViSiMe$_2$O$_{1/2}$:Me$_2$SiO$_{2/2}$:MeSi(CH$_2$CH$_2$CH$_2$—NH$_2$)O$_{2/2}$=2:28.4:3.2 were initially charged and reacted with 34.5 g (0.178 mol) of 2-methyl-5-(1-methylethyl)phenyl carbamate (=carvacrol carbamate). According to the $^1$H-NMR spectrum, the following urea-functional organopolysiloxane having a urea content of 1.14 mmol/g was obtained: ViSiMe$_2$O$_{1/2}$:Me$_2$SiO$_{2/2}$:MeSi[(CH$_2$)$_3$—NHC(O)—NH$_2$]O$_{2/2}$=2:28.4:3.

b) In a manner analogous to the procedure of example 4a), a urea-functional organopolysiloxane which has a urea content of 0.652 mmol/g and according to the $^1$H-NMR spectrum has the following average formula: ViSiMe$_2$O$_{1/2}$:Me$_2$SiO$_{2/2}$:MeSi[(CH$_2$)$_3$—NHC(O)—NH$_2$]O$_{2/2}$=2:166.4:9.1 was obtained.

c) In a manner analogous to the procedure of example 4a), a urea-functional organopolysiloxane which has a urea content of 0.3 mmol/g and according to the $^1$H-NMR spectrum has the following average formula: ViSiMe$_2$O$_{1/2}$:Me$_2$SiO$_{2/2}$:MeSi[(CH$_2$)$_3$—NHC(O)—NH$_2$]O$_{2/2}$=2:159.3:3.7 was obtained.

d) In a manner analogous to the procedure of example 4a), a urea-functional organopolysiloxane which has a urea content of 0.282 mmol/g and according to the $^1$H-NMR spectrum has the following average formula: ViSiMe$_2$O$_{1/2}$:Me$_2$SiO$_{2/2}$:MeSi[(CH$_2$)$_3$—NHC(O)—NH$_2$]O$_{2/2}$=2:48:1.1 was obtained.

EXAMPLE 5

Figure 2:
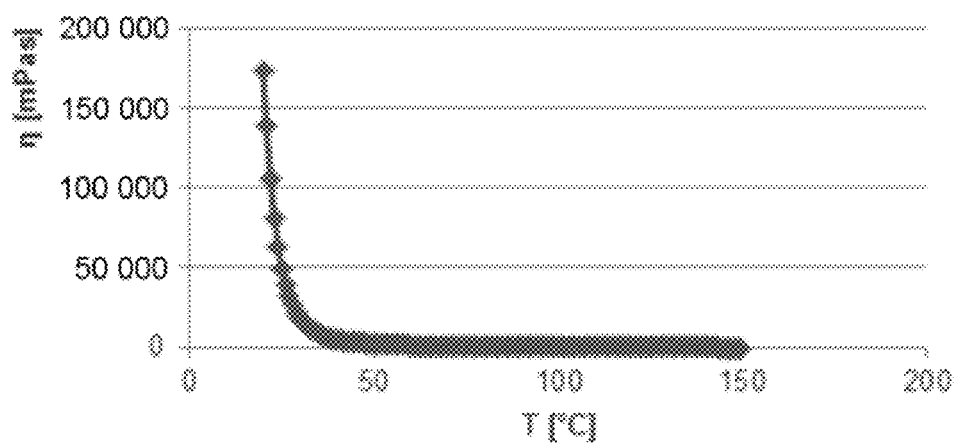
FIG. 2 illustrates the relationship between temperature and viscosity for the urea-functional organopolysiloxane of Example 4b).

Determination of the Temperature Dependence of the Viscosity of the Urea-Functional Organopolysiloxanes The temperature dependence of the viscosity of the urea-functional organopolysiloxanes was determined and is presented in graph form for example 4a) in FIG. 1 and for example 4d) in FIG. 2.

Furthermore, the viscosity/temperature coefficient of the urea-functional organopolysiloxanes of examples 4a) to 4d) was determined. Dimethylpolysiloxanes having a viscosity of from about 33 to about 340 mPa·s at 25° C. (WACKER® AK 35 Siliconöl-WACKER® AK 350 Siliconöl) and a viscosity of more than about 485 mPa·s at 25° C. (WACKER® AK 500 Siliconöl) served as comparison. The results are summarized in tables 1 and 2.

In the temperature-dependent measurement, the sample was heated at 1 K/min. from 20° C. to 150° C. on a rheometer MCR301 from Anton Paar and the shear stress was measured at each degree at a constant shear rate of 1/s and converted into the viscosity. As software, the Rheoplus/32 software from Anton Paar was used.

Dynamic viscosities were measured on an "MCR 302" rheometer from Anton Paar in accordance with DIN EN ISO 3219: 1994 and DIN 53019 using a cone-plate system (cone CP25-2 or CP50-2) having an opening angle of 2° and the cone spacing a indicated below.

For the temperature-dependent measurement, the sample was heated at 1 K/min. from 20° C. to 150° C. and the shear stress was measured at each degree at a constant shear rate of 1/s and converted into the viscosity. As software, the Rheoplus/32 software from Anton Paar was used.

The measurement arrangement in detail:
Examples 4a) and 4b): CP25-2, a=0.047 mm
Examples 4c) and 4d): CP50-2, a=0.048 mm The measurement conditions were derived from the linear range of the flow curves at 20° C.

TABLE 1

Temperature dependence of the viscosity of the urea siloxanes

| Example | Aminosiloxane ν [mm$^2$/s] (25° C.) | Urea siloxane μ [mPa·s] (25° C.) | Chain length | Urea content [mmol/g] | Viscosity/T coefficient[1] | Viscosity decrease between 38° and 99° C. |
|---|---|---|---|---|---|---|
| B 4a) | 51 | 50,000 | 32.6 | 1.14 | 0.96 | 96% |
| B 4b) | 500 | 42,000 | 177.5 | 0.652 | 0.93 | 93% |
| B 4c) | 685 | 12,500 | 165 | 0.3 | 0.90 | 90% |
| B 4d) | 66 | 600 | 51 | 0.282 | 0.86 | 86% |

[1])Viscosity/temperature coefficient = 1 − ν(99° C.)/ν(38° C.)

TABLE 2

Comparison of the temperature dependence of the viscosity of dimethylpolysiloxanes

| Comp. | | Viscosity μ [mPa·s] (25° C.) | Chain length | | Viscosity/T coefficient[1] | Viscosity decrease between 38° and 99° C. |
|---|---|---|---|---|---|---|
| AK35[2])-AK350[3]) | — | 33-340 | 30-130 | — | 0.585-0.595 | ≈59% |
| >AK500[4]) | — | >485 | >155 | — | 0.60 | 60% |

[1])Viscosity/temperature coefficient = 1 − ν(99° C.)/ν(38° C.)
[2])Dimethylpolysiloxane, WACKER® AK 35 Siliconöl, commercially available from Wacker Chemie AG, Munich
[3])Dimethylpolysiloxane, WACKER® AK 350 Siliconöl, commercially available from Wacker Chemie AG, Munich
[4])Dimethylpolysiloxane, WACKER® AK 500 Siliconöl, commercially available from Wacker Chemie AG, Munich Table 1 shows that with increasing urea concentration in the urea-functional siloxanes of the invention the viscosity/temperature coefficient increases from 0.86 to 0.96, i.e. the viscosity decrease between 38° C. and 99° C. increases from 86% to 96%. In comparison, table 2 shows that the viscosity/temperature coefficient of dimethylpolysiloxanes having a similar chain length is significantly smaller and is about 0.6, the viscosity decrease is thus significantly lower and is about 60%.

The invention claimed is:

1. A process for preparing urea-functional organopolysiloxanes comprising units of the formula (I)

$$R_nSiO_{(4-n)/2} \quad (I)$$

where
R is a radical R$^1$, a radical —OR$^2$, or a radical Q,
R$^1$ is a monovalent optionally halogenated hydrocarbon radical having from 1 to 18 carbon atoms,
R$^2$ is hydrogen or a monovalent C$_1$-C$_6$-hydrocarbon radical,
Q is a urea-functional radical of the formula (II)

$$—R^5—[NR^4—R^6—]_xNR^4R^3 \quad (II),$$

where
R$^3$ is hydrogen or a monovalent C$_1$-C$_6$-hydrocarbon radical, the radicals R$^4$ are identical or different and are each a radical R$^{4t}$ or a radical R$^u$, where
R$^{4t}$ is hydrogen or a monovalent C$_1$-C$_6$-hydrocarbon radical,
R$^u$ is a radical of the formula (III)

$$—C(=O)—NH_2 \quad (III)$$

$R^5$ is a divalent $C_1$-$C_{18}$-hydrocarbon radical,
$R^6$ is a divalent $C_1$-$C_{18}$-hydrocarbon radical,
x is 0, 1 or 2 and
n is 0, 1, 2 or 3,
with the proviso that at least one urea-functional radical Q, which has a radical $R''$ is present per molecule in the organopolysiloxanes comprising units of the formula (I),
the process comprising:
  reacting amino-functional organopolysiloxanes comprising units of formula (IV)

$$R'_n SiO_{(4-n)/2} \quad (IV),$$

where
$R'$ is a radical $R^1$, or a radical $-OR^2$, or a radical A,
$R^1$, $R^2$ and n are as defined above and
A is an amino-functional radical of the formula (V)

$$-R^5-[NR^{4'}-R^6-]_x NR^4 R^3 \quad (V),$$

where
$R^3$, $R^{4'}$, $R^5$, $R^6$ and x are as defined above,
with the proviso that at least one amino-functional radical A containing at least one —NH— is present per molecule in the organopolysiloxanes comprising units of formula (IV),
with
2-methoxyphenyl carbamate, 2-methyl-5-(1-methylethyl) phenyl carbamate, or a mixture thereof.

2. The process of claim 1, wherein in the urea-functional organopolysiloxanes comprising units of the formula (I)
  at least 50% of all radicals R are a $C_1$-$C_6$-alkyl radical $R^1$,
  at least 0.1% of all radicals R are a radical Q of the formula (II), where at least one radical $R^4$ in at least one radical Q is $R''$, and
  not more than 3% of all radicals R are a radical $-OR^2$.

3. The process of claim 1, wherein the urea-functional organopolysiloxanes comprising units of the formula (I) contain at least 3 Si atoms and not more than 2000 Si atoms.

4. The process of claim 1, wherein in the amino-functional organopolysiloxanes comprising units of the formula (IV),
  at least 50% of all radicals R are a $C_1$-$C_6$-alkyl radical $R^1$,
  at least 0.1% of all radicals R are a radical A of the formula (V) and
not more than 3% of all radicals R are a radical $-OR^2$.

5. The process of claim 1, wherein the amino-functional organopolysiloxanes comprising units of formula (IV) contain at least 3 Si atoms and not more than 2000 Si atoms.

6. The process of claim 1, wherein the urea-functional organopolysiloxanes comprising units of the formula (I) are organopolysiloxanes of the formula (VII)

$$Q_k R^*_{3-k} SiO(R^1_2 SiO)_m (QR^*SiO)_p SiR^*_{3-k} Q_k \quad (VII)$$

where
$R^*$ is a radical $R^1$ or a radical $-OR^2$,
Q is a urea-functional radical of the formula (II)

$$-R^5-[NR^4-R^6-]_x NR^4 R^3 \quad (II),$$

where
$R^3$ is hydrogen or a monovalent $C_1$-$C_6$-hydrocarbon radical, the radicals $R^4$ are identical or different and are each a radical $R^{4'}$ or a radical $R''$, where
$R^{4'}$ is a hydrogen atom or a monovalent $C_1$-$C_6$-hydrocarbon radical and
$R''$ is a radical of the formula (III)

$$-C(=O)-NH_2 \quad (III),$$

$R^5$ is a divalent $C_1$-$C_{18}$-hydrocarbon radical,
$R^6$ is a divalent $C_1$-$C_{18}$-hydrocarbon radical, k is 0 or 1,
m is 0 or an integer from 1 to 1000,
p is 0 or an integer from 1 to 50 and
x is 0, 1 or 2,
with the proviso that at least one urea-functional radical Q, which has a radical $R''$ is present per molecule in the organopolysiloxanes of the formula (VII).

7. The process of claim 1, wherein the urea-functional radicals Q of the formula (II) are radicals of the formula $CH_2-CH_2-CH_2-NH-C(=O)-NH_2$, $CH_2-CH_2-CH_2-NH-CH_2-CH_2-NH-C(=O)-NH_2$, $CH_2-CH_2-CH_2-N[-C(=O)-NH_2]-CH_2-CH_2-NH-C(=O)-NH_2$, or $CH_2-CH_2-CH_2-N[-C(=O)-NH_2]-CH_2-CH_2-NH_2$.

8. The process of claim 1, wherein organopolysiloxanes of the formula (VIII)

$$A_l R^*_{3-l} SiO(R^1_2 SiO)_o (AR^*SiO)_q SiR^*_{3-l} A_l \quad (VIII),$$

where
$R^*$ is a radical $R^1$ or a radical $OR^2$,
A is an amino-functional radical of the formula (V)

$$-R^5-[NR^{4'}-R^6-]_x NR^4 R^3 \quad (V),$$

where
$R^3$ is hydrogen or a monovalent $C_1$-$C_6$-hydrocarbon radical, where
$R^{4'}$ is a hydrogen atom or a monovalent $C_1$-$C_6$-hydrocarbon radical and
$R^5$ is a divalent $C_1$-$C_{18}$-hydrocarbon radical,
$R^6$ is a divalent $C_1$-$C_{18}$-hydrocarbon radical,
x is 0, 1 or 2,
l is 0 or 1,
o is 0 or an integer from 1 to 1000,
q is 0 or an integer from 1 to 50,
with the proviso that at least one amino-functional radical A containing at least one —NH— is present per molecule in the organopolysiloxanes of the formula (VIII), are used as amino-functional organopolysiloxanes comprising units of the formula (IV).

9. The process of claim 1, wherein radicals of the formula $CH_2-CH_2-CH_2-NH_2$ and $-CH_2-CH_2-CH_2-NH-CH_2-CH_2-NH_2$ are present as amino-functional radicals A of the formula (V).

10. A process for preparing urea-functional organopolysiloxanes comprising units of the formula (I)

$$R_n SiO_{(4-n)/2} \quad (I)$$

where
R is a radical $R^1$, a radical $-OR^2$, or a radical Q,
$R^1$ is a monovalent optionally halogenated hydrocarbon radical having from 1 to 18 carbon atoms,
$R^2$ is hydrogen or a monovalent $C_1$-$C_6$-hydrocarbon radical,
Q is a urea-functional radical of the formula (II)

$$-R^5-[NR^4-R^6-]_x NR^4 R^3 \quad (II),$$

where
$R^3$ is hydrogen or a monovalent $C_1$-$C_6$-hydrocarbon radical, the radicals $R^4$ are identical or different and are each a radical $R^{4'}$ or a radical $R''$, where
$R^{4'}$ is hydrogen or a monovalent $C_1$-$C_6$-hydrocarbon radical, R" is a radical of the formula (III)

$$-C(=O)-NH_2 \quad (III)$$

$R^5$ is a divalent hydrocarbon radical,
$R^6$ is a divalent hydrocarbon radical,
x is 0, 1 or 2 and
n is on average from 2.00 to 2.66,
with the proviso that at least one urea-functional radical Q, which has a radical R" is present per molecule in the organopolysiloxanes comprising the formula (I),
the process comprising:
  reacting amino-functional organopolysiloxanes comprising units of formula (IV)

$$R'_n SiO_{(4-n)/2} \quad (IV),$$

where
R' is a radical $R^1$ or a radical $-OR^2$ or a radical A,
$R^1$, $R^2$ and n are as defined above and
A is an amino-functional radical of the formula (V)

$$-R^5-[NR^{4'}-R^6-]_x NR^{4'}R^3 \quad (V),$$

where
$R^3$, $R^{4'}$, $R^5$, $R^6$ and x are as defined above,
with the proviso that at least one amino-functional radical A containing at least one —NH— is present per molecule in the organopolysiloxanes made up of units of formula (IV),
with
2-methoxyphenyl carbamate, 2-methyl-5-(1-methylethyl) phenyl carbamate, or a mixture thereof.

* * * * *